(12) United States Patent
White

(10) Patent No.: US 9,962,589 B2
(45) Date of Patent: May 8, 2018

(54) HARNESS FOR TOWBOARDING

(71) Applicant: Matthew David White, Oviedo, FL (US)

(72) Inventor: Matthew David White, Oviedo, FL (US)

(*) Notice: Subject to any disclaimer, the term of this patent is extended or adjusted under 35 U.S.C. 154(b) by 106 days.

(21) Appl. No.: 15/098,512

(22) Filed: Apr. 14, 2016

(65) Prior Publication Data

US 2016/0332708 A1    Nov. 17, 2016

Related U.S. Application Data

(60) Provisional application No. 62/147,259, filed on Apr. 14, 2015.

(51) Int. Cl.
    *A63B 69/00* (2006.01)
    *A01K 27/00* (2006.01)

(52) U.S. Cl.
    CPC ........ *A63B 69/0093* (2013.01); *A01K 27/002* (2013.01); *A63B 2209/00* (2013.01)

(58) Field of Classification Search
    CPC ............ A63B 69/0093; A63B 2209/00; A01K 27/002; A01K 27/00; A45F 3/047; A62B 35/0012
    USPC ....................................................... 224/184
    See application file for complete search history.

(56) References Cited

U.S. PATENT DOCUMENTS

| | | | | |
|---|---|---|---|---|
| 3,004,519 A | * | 10/1961 | Weissman | A47D 15/006 119/857 |
| 4,112,865 A | * | 9/1978 | Carn | B63B 35/7993 114/39.18 |
| 4,452,161 A | * | 6/1984 | McCoy | B63B 35/7993 114/39.18 |
| 4,508,045 A | * | 4/1985 | Spanier | B63B 35/7996 114/39.18 |
| 4,667,624 A | * | 5/1987 | Smith | A01K 27/00 119/770 |
| 6,349,960 B1 | | 2/2002 | Peterson | |
| 7,036,628 B2 | | 5/2006 | Wilcox et al. | |
| 7,445,085 B2 | * | 11/2008 | Petzl | A62B 35/0012 182/3 |
| 7,992,506 B1 | | 8/2011 | Patton et al. | |
| 8,495,967 B2 | | 7/2013 | Williams et al. | |
| 9,758,221 B2 | * | 9/2017 | Harrington | B63B 35/7993 |
| 2005/0279797 A1 | * | 12/2005 | Martin | A44B 11/065 224/637 |
| 2006/0046589 A1 | * | 3/2006 | Farley | B63B 35/79 441/108 |
| 2009/0057360 A1 | * | 3/2009 | Demsky | A45F 3/047 224/262 |

* cited by examiner

*Primary Examiner* — Peter Helvey
(74) *Attorney, Agent, or Firm* — Daniel C. Pierron; Widerman Malek, PL

(57) ABSTRACT

A harness comprising a back section, a padded waist strap extending from the back section and comprising a waist strap connector, a waist strap attached to the padded waste strap and comprising a waist strap connector, a towing strap attached to a posterior surface of the back section and a towing connector slidably coupled to the towing strap. The waist strap connector of the waist strap is operable to couple to the waist strap connector of the padded waist strap.

20 Claims, 7 Drawing Sheets

HARNESS FOR TOWBOARDING

RELATED APPLICATIONS

This application claims the benefit under 35 U.S.C. § 119(e) of U.S. Provisional Patent Application Ser. No. 62/147,259 titled HARNESS FOR TOWBOARDING filed on Apr. 14, 2015.

FIELD OF THE INVENTION

The present invention relates to a human-worn harness for towboarding.

BACKGROUND

Towboarding (similar to skimboarding) is a widely-practiced athletic endeavor. A towboarder (i.e., the human operator) of the board is pulled on a board by another human wearing a harness. The board can be specially designed for towboarding, or it can be another type of board such as a skimboard, wakeboard, wake skateboard, skates, snowboard, skateboard, landboard, iceboard, buggy, wake ski, etc. The person towing the towboarder wears a harness for transmitting the pull force of a towboarder's weight to the body of the wearer. The harness is connected to a tow rope, at the end of the tow rope, the rope is connected to a handle (also known as a wakeboard handle) through appropriate rigging, such as a tow mount connector for a towboarder to hold onto. The wearer of the harness can pull a towboarder over many different surfaces, including water, ice, snow and even flooded terra firma. The harness usually includes a towing connector at the rear (i.e., a girdle or vest). The heavy-duty towing connector is attached to the back of the harness on the lower half of it at waist level. The towing connector extends outward from the harness at the pelvis for catching a looped rope (also known as wakeboarding rope) through appropriate rigging.

While generally effective for transmitting the pull force of the towboarder's weight throughout the body of the wearer of the tow harness, the harness tends to exert an intermittent twisting or torsional force upon the body of the harness wearer whenever the towboarder desires to ride at an angle relative to the direction of the pull force of the towboarder and also tends to exert a "jerking" torsion force upon the body of the wearer whenever the towboarder makes a significant lateral shift relative to the wearer. Such torsional forces tend to prematurely fatigue to the wearer of the tow harness.

Variations of towboarding exist but they use other methods of towing a towboarder, such as, a snowmobile, all-terrain vehicle (ATV), bicycle, motorcycle, gas powered winch, etc. However, all suffer a short coming in that none of the methods listed use a person to tow another person on a board. Moreover, human-mounted harnesses existing in the art are susceptible to the deleterious forces, resulting in physical harm to the operator and an inferior experience for the towboarder. The purpose of the present invention is to use a person with a specialized tow harness to tow a towboarder without the use of a mechanical device.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a harness comprising a back section, a padded waist strap extending from the back section and comprising a waist strap connector, a waist strap attached to the padded waste strap and comprising a waist strap connector, a towing strap attached to a posterior surface of the back section, and a towing connector slidably coupled to the towing strap. The waist strap connector of the waist strap may be operable to couple to the waist strap connector of the padded waist strap.

DETAILED DESCRIPTION OF THE INVENTION

Figure 1:
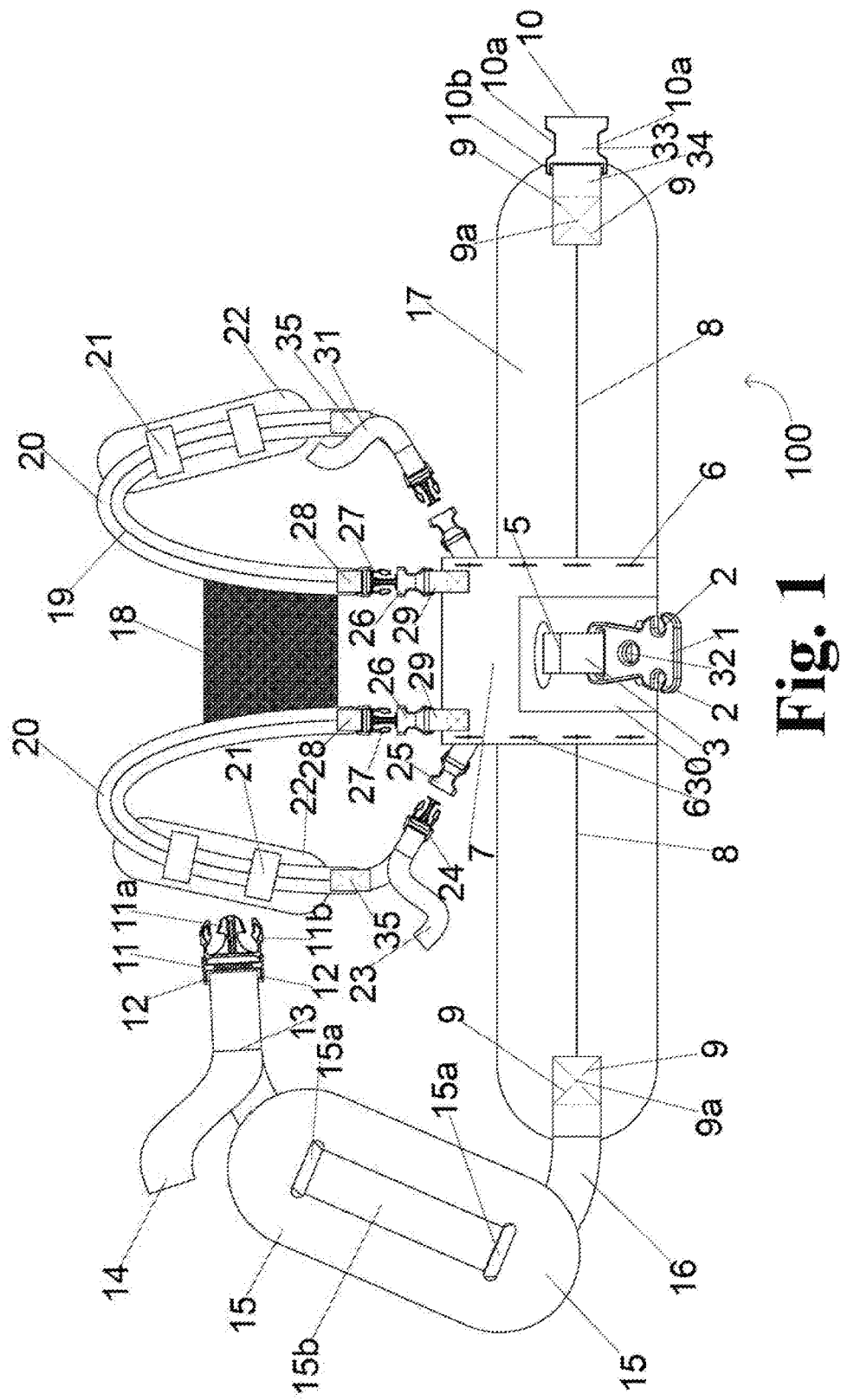
FIG. 1 is a rear elevation view of a tow harness according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified. Additionally, the term "rigging" refers to all components of a tow harness according to the various embodiments of the invention, a tow rope, and a handle, or subsets thereof.

An embodiment of the invention, as shown and described by the various figures and accompanying text, provides a towboarding harness comprising a waist strap, a towing connector attached to the waist strap, and connectors to secure the harness to an operator. The harness has many uses and offers several advantages. A first advantage is that the harness provides the wearer with greater freedom of movement relative to prior art harnesses. While towing a towboarder, the pull-force provided by the weight, friction, and tension of the towboarder and board can come from any point behind or to the side of the wearer of the harness. While towboarding, the towboarder tends to change position frequently and pull at different tensions during maneuvers and stunts. Resulting in frequent changes in the direction of the pull force and the force of the pulling. In order to maximize distribution of the pull-force throughout the body of the tow harness wearer, the line of the pull-force should extend through or a least proximate the posteroanterior axis of the wearer's body. By allowing a towing connector of the harness to reposition itself along a towing strap, the harness is capable of quickly adjusting with changes in position of the pull force so as to keep the direction of the pull force in line with or at least proximate the posteroanterior axis of the harness wearer's body. The advantage is especially beneficial when the direction of the pull-force changes so as to pull from a direction from the side or at an angle to the operator 54. When this happens to a harness with a towing connector fixedly attached to the back of the harness, the rigging (i.e., the towing connector and towing strap) may wrap across the body of the wearer, causing discomfort, chafing, and/or bruising.

Another advantage of the harness is that the towing connector allows for the rope to be quickly installed or removed by the towboarder or wearer should circumstances dictate.

Figure 2:
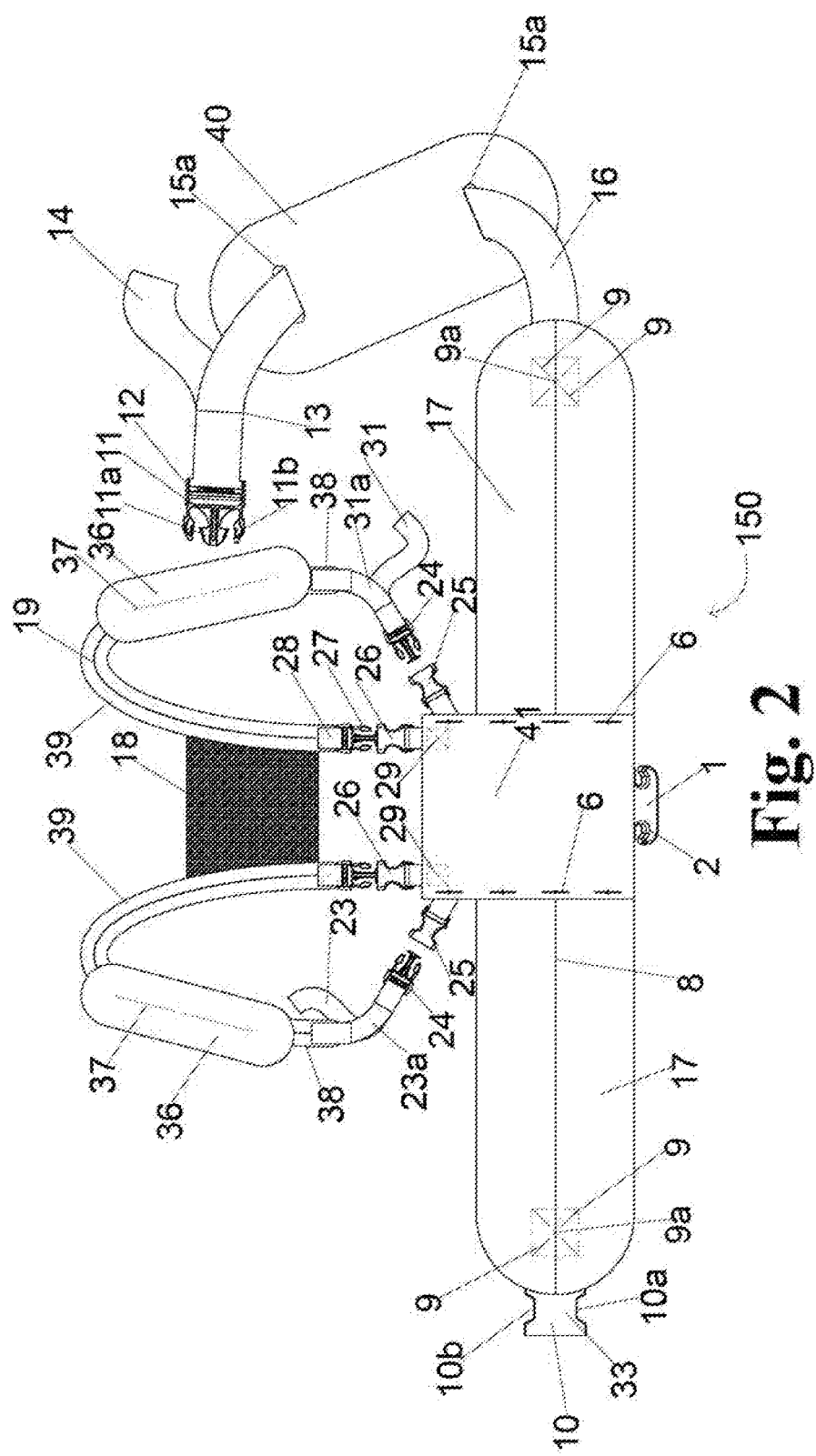
FIG. 2 is a front perspective view of the tow harness of FIG. 1.
Figure 3:
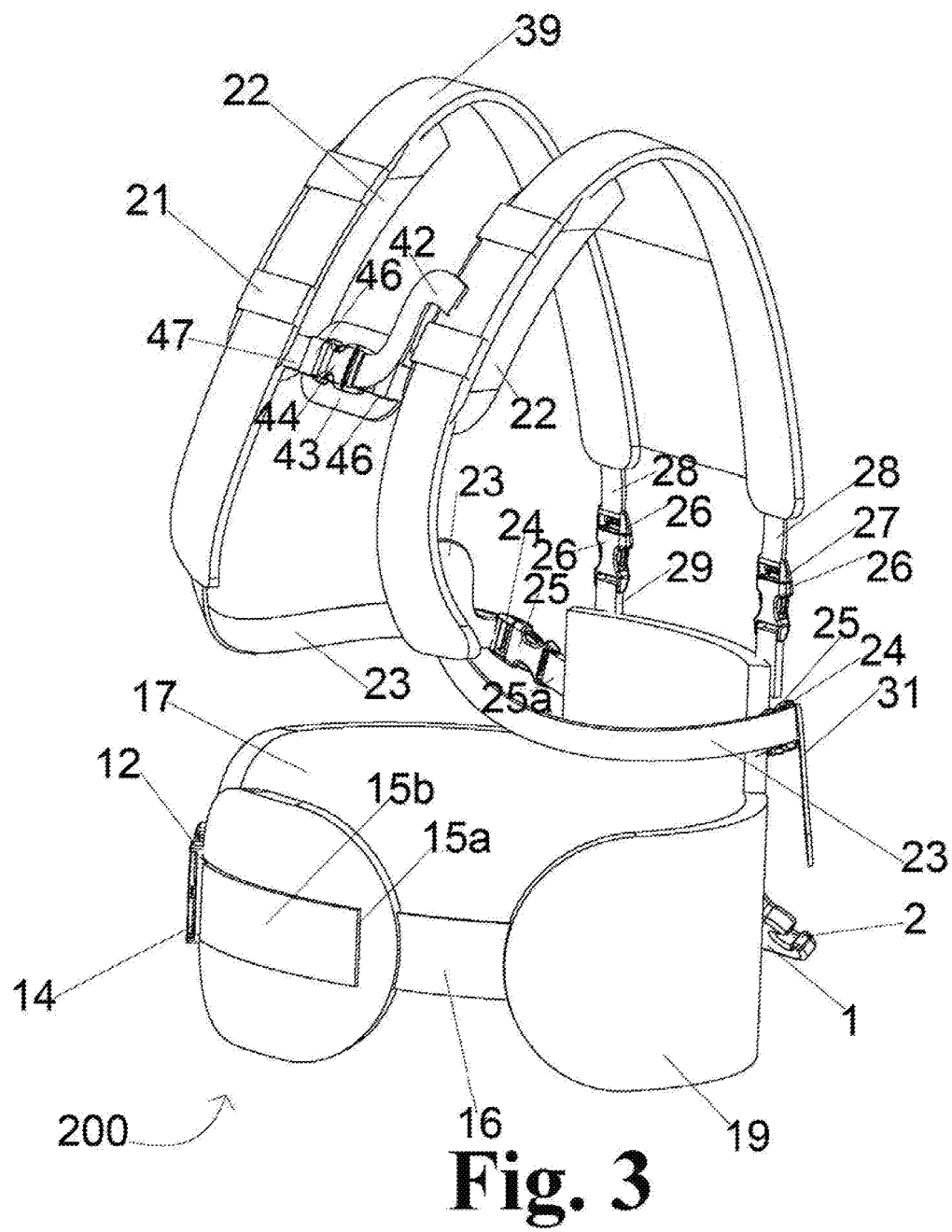
FIG. 3 is a perspective view of the tow harness of FIG. 1.

Referring specifically to FIGS. 1-3, a harness 100 according to an embodiment of the invention will be discussed. The harness 100 comprises a front section 41, a back section 7 comprising stitching 6, a padded waist strap 17 extending from the back section 7 and comprising a waist strap connector, a waist strap 16 attached to the padded waist strap 17 comprising a waist strap connector, shoulder straps 20, towing connector 1, and waist strap pad 15. The waist strap 16 and the padded waist strap 17 may be configured so as to circumscribe the midsection of the operator 54 and be connected so as to at least partially secure harness 100 to the operator 54. Each of the waist strap 16 and a female-end buckle 10 may be attached to the padded waist strap 17 at a rear attachment section 9 at opposite ends of the padded waist strap 17. In the present embodiment, the waist strap 16 and the female-end buckle 10 are attached by a webbing that is stitched 9a onto the padded waist strap 17.

The towing connector 1 may be attached to the waist strap 16 so as to be carried proximal to an outer surface thereof while being attached internally. More specifically, the towing connector 1 may be attached by a towing strap 3. The towing connector 1 may be attached to the towing strap 3 so as to enable the towing connector 1 to slide along a length of the towing strap 3. In the present embodiment, the towing strap 3 is attached in a generally vertical orientation, such that the towing connector 1 may slide vertically. In alternative embodiments, the towing strap 3 may be connected in a generally horizontal orientation, such that the towing connector may slide horizontally.

In some embodiments, the harness 100 may further comprise a reinforced platform 30 defining a reinforced area. This positioning of the reinforced platform 30 intermediate the towing strap 3 and the operator prevents the towing strap 3 and the towing connector 1 from rubbing against the operator as the towing connector 1 slides along the towing strap 3. The reinforced platform 30 is an additional element, and embodiments of the invention may not include a reinforced platform 30. Accordingly, where reference is made to the reinforced platform, alternative embodiments may replace the reinforced platform 30 with either the padded waist strap 17 or the back section 7 of the harness 100.

Figure 6:
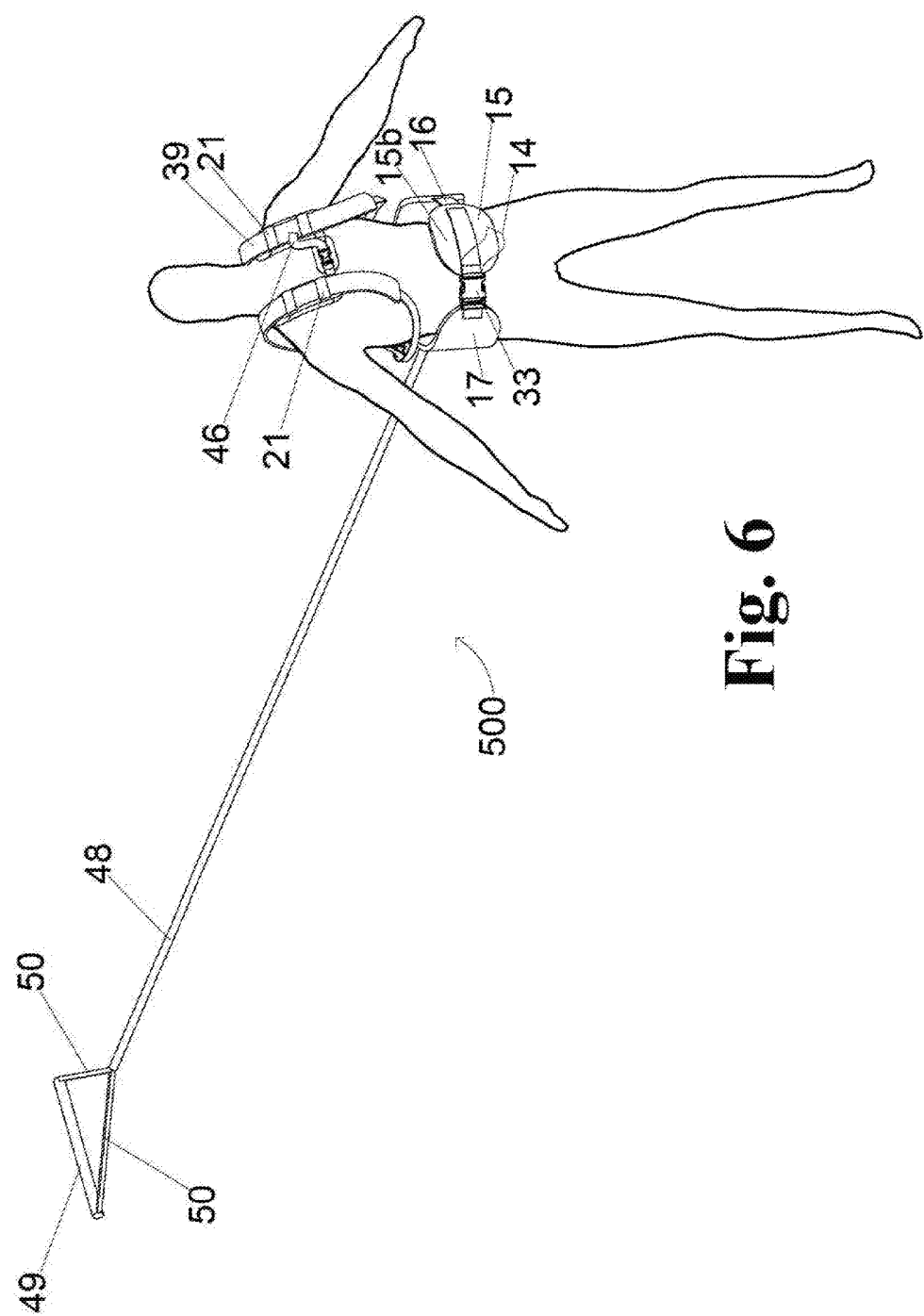
FIG. 6 is a front perspective view of the tow harness of FIG. 1 being worn by an operator and having a tow rope and handle attached thereto.
Figure 7:
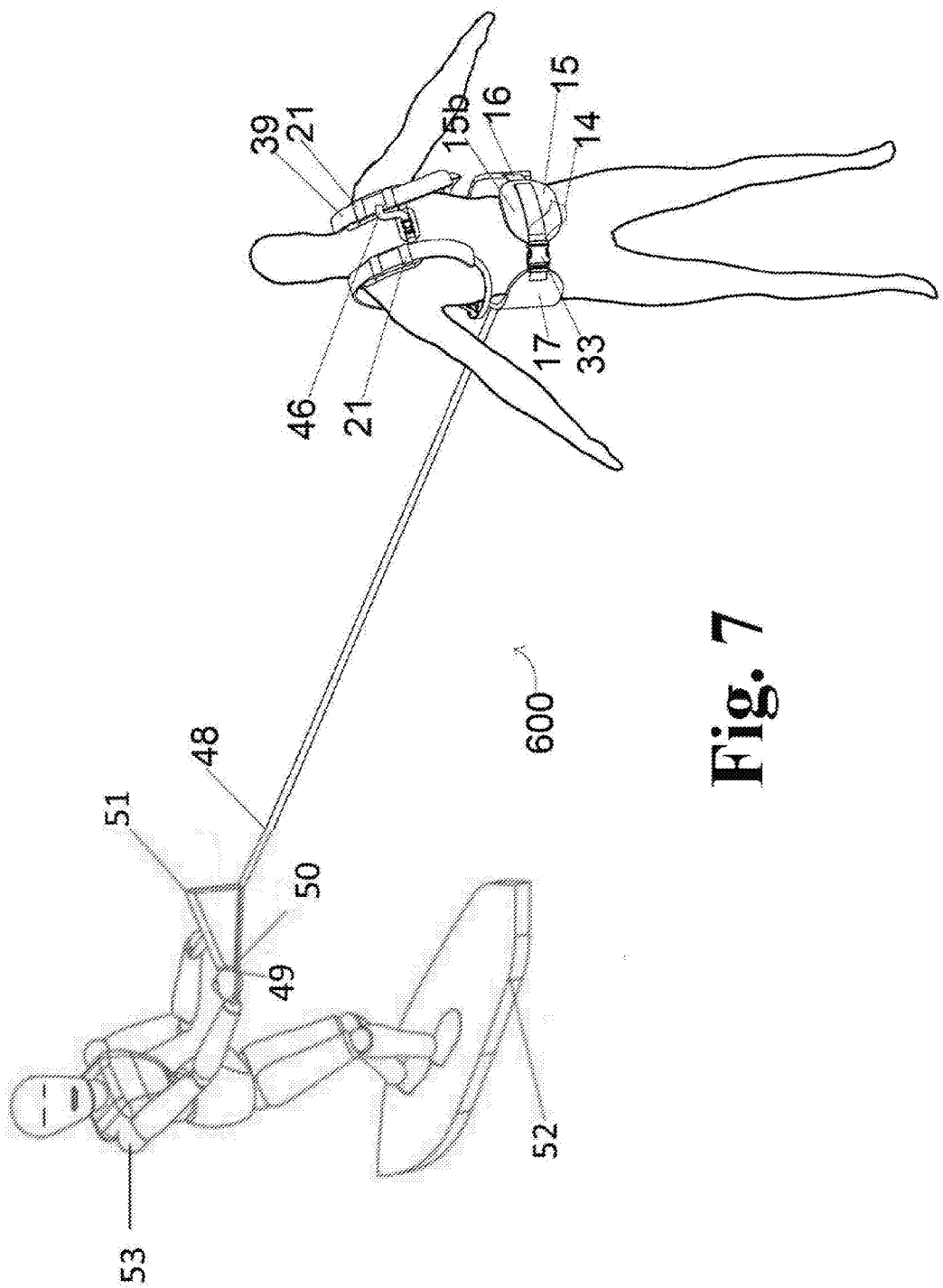
FIG. 7 is a front perspective view of the tow harness of FIG. 6 further depicting a towboarder.

Referring now additionally to FIGS. 6 and 7, the towing connector 1 may secure a rope 48 to the harness 100 via conventional rigging 1a such as towing connector 1, a towing strap 3 and an eyelet 32. The towing connector 1 may be attached to the tow strap 3 and reinforced platform 30 at a position such that as is slides along the length of the towing strap 3, it is sliding about the posteroanterior axis of the operator 54. The towing connector 1 may further comprise laterally spaced notches 2 that may facilitate the attachment of the rope 48.

The harness 100 may further comprise securing features and structures to facilitate the wearing of the harness 100 by the operator 54, so as to prevent the harness 100 from coming detached from the operator 54, and further to prevent undesired movement of the harness 100 relative to the operator 54. In some embodiments, the harness 100 may comprise buckles. In the present embodiment, the harness 100 comprises waist trap connectors that comprise a male-end buckle 11 connected to the waist strap 16 and a female-end buckle 10 connected to the padded waist strap 17. The male-end buckle body 11 may securely connect to the female-end buckle 10 so as to position the waist strap 16 and the waist strap pad 15, and the waist strap 16 in the front of the operator 54, such that the waist strap pad 15 is positioned adjacent to the abdomen of the operator 54. The waist strap 16 and the waist strap pad 15 may be conventional pieces of towboarding equipment. The present invention can be employed with substantially any waist strap 16, waist strap pad 15, tow connector 1, male-end buckle body 11, and female-end buckle 10, as are known in the art. The male-end buckle 11 may comprise a middle prong 11a and an outer prong 11b, and the female-end buckle 10 may comprise openings 10a and a looped waist buckle 10b. The male-end buckle 11 may include a looped slot 12 through which the waist strap 16 may pass through, thereby attaching the male-end buckle 11. The harness 100 may further comprise a holder 13 configured to overlie the waist strap 16 to control an excess portion 14 of the waist strap 16. The invention can also be used with an intergraded board short design (not shown). The above mentioned features, 11, 16, 15, 1, can be made of many different materials. For example, portions of it can be made of polyurethane, nylon, sea board, and various kinds of reinforcement and padding as are known in the art. Furthermore, the use of a buckle apparatus is merely illustrative and any means, method, or structure as is known in the art may be employed to connect the waist strap 16 to the padded waist strap 17 about the midsection of the operator 54. The female-end buckle 10 may generally align with the middle 8 of the padded waist strap 17.

The towing strap 3 may be connected to at least one of the back section 7 and the padded waist strap 17 at attachment points 4 at first and second ends of the towing strap 3 by any suitable type and means of attachment, including, but not limited to, stitching and rivets. In the present embodiment, the attachment points 4 may be positioned a distance apart within the range from one inch to four inches. The attachment sections may be located on a posterior surface of the back section 7. One or both of the attachment points may be within the area defined by the reinforced platform 30, where present, or outside said area. The towing strap 3 can be a flexible member, such as rope, webbing, strap, belt, or a rigid member such as a bar or beam. In some embodiments, the towing strap 3 may be a webbing made of synthetic materials such as polypropylene or polyester.

As shown in FIG. 1, the towing connector 1 may be spaced from the back 7 of the harness 700 and the reinforcement platform 30 to create a gap between the towing strap 3 and the reinforcement platform 30. The gap can be up to 1.25 inches in depth, can allow the towing connector 1 to freely slide along the length of the towing strap 3. In some embodiments, especially when the towing strap 3 is a flexible member such as webbing, for tow strap 3 and towing connector 1 may fit snugly against the reinforcement platform 30 and the body of the harness 700. The towing strap 3 and the towing connector 1 can be of various cross-sectional shapes, diameters or dimensions. For many applications, they may be flat webbing material having a width of 1.5 inches and a thickness within the range from 0.06 to 0.08 inches. Other diameters or other dimensions are contemplated and included within the scope of the invention.

The towing connector 1 may comprise an eyelet 32 for rope (i.e., equipped with laterally spaced notches and an eyelet 32 for rope to fit through). The towing connector 1 may be capable of releasably engaging and holding the rigging 1a, typically the reinforcement platform 30. The towing connector 1 can be made from many materials including metals, such as aluminum and steel, and plastics such as polyurethane. The towing strap 3 and or towing connector 1 may include a wheel, pulley, or other device (not shown) for facilitating movement of the towing connector 1 along the towing strap 3.

The towing connector 1 can be positioned and attached to a operator 54 in a myriad of ways. For example, the towing connector 1, towing strap 3, and reinforced platform 30 could be integrated into a pair of shorts (not shown), board shorts (not shown), a belt (not shown), a vest (not shown), a body suit (not shown), etc. The towing connector 1 could also conceivably attached directly to the body of a operator 54 with an adhesive (not shown).

The towing connector 1 can be fixedly attached (i.e., directly attached by stitching and/or rivets) or releasably attached (i.e., via a buckle, D-ring, clip or carabiner) to reinforced platform 30.

Separate components can be employed to provide the sliding and hooking functions of the towing connector 1. For example, a closed ring (not shown) can slidably encircle the towing strap 3 while a towing strap 3, hooked onto the closed ring, and provides the hooking function. The towing connector 1 can be permanently attached to the towing strap 3 or releasably attached to the towing connector 1 (i.e., a mechanism on the towing connector 1 permitting detachment of the tow connector 1 from the towing strap 3 or a mechanism on the towing strap 3 for permitting detachment of the towing strap 3 from the towing connector 1 and thereby allowing the towing connector 1 to be slid off the end of the detached towing strap 3.

The towing strap 3 and the towing connector 1 may be configured so as to allow them to be retrofit onto existing harnesses. The towing connector 1 could be configured and arranged to permit direct attachment of the towing connector 1 to a rope 48 (i.e., a "built-in" towing connector) or even directly to the rope 48.

The waist strap padding 15 may be attached to the waist strap by threading the waist strap through a waist strap slot 15a, with a portion 15b of the waist strap 16 extending over the waist strap padding 15.

The harness 100 may further comprise shoulder straps 20 comprising shoulder pads 22 with sleeves 21 and having an exterior surface 39. Specifically, the harness 100 may comprise a left shoulder strap 23 and a right shoulder strap 31, each comprising an inferior male-end buckle 24 and a superior male-end buckle 27 at opposing ends of the left shoulder strap 23, which may be attached by any means or method known in the art, including stitching 35, 28. Furthermore, the shoulder straps 20 may comprise stitching 19. Furthermore, a back support 18 may be attached between the shoulder straps 20. In some embodiments, the back section 7 may include superior shoulder strap female-end buckles 26 and inferior shoulder strap female-end buckles 25 that cooperate with the superior and inferior male-end buckles 24, 27 respectively to attach the shoulder straps 20 to the back section 7. The superior and inferior shoulder strap female-end buckles 26, 25 may be attached by any means or method known in the art, including stitching 29. Furthermore, an inferior strap 25a may facilitate the connection of the inferior shoulder strap female-end buckle 25 with the inferior male-end buckle 24 by enabling the inferior shoulder strap female-end buckle 25 to move to meet the inferior male-end buckle 24.

The shoulder straps 20 may further comprise a front female-end connector 44, a front male-end connector 45, a front female-end connector strap 42, and a loop-on buckle for the front female-end connector strap 42, and a front male-end connector strap 47 to enable the operator to tightly strap the harness 100 across their chest.

Figure 4:
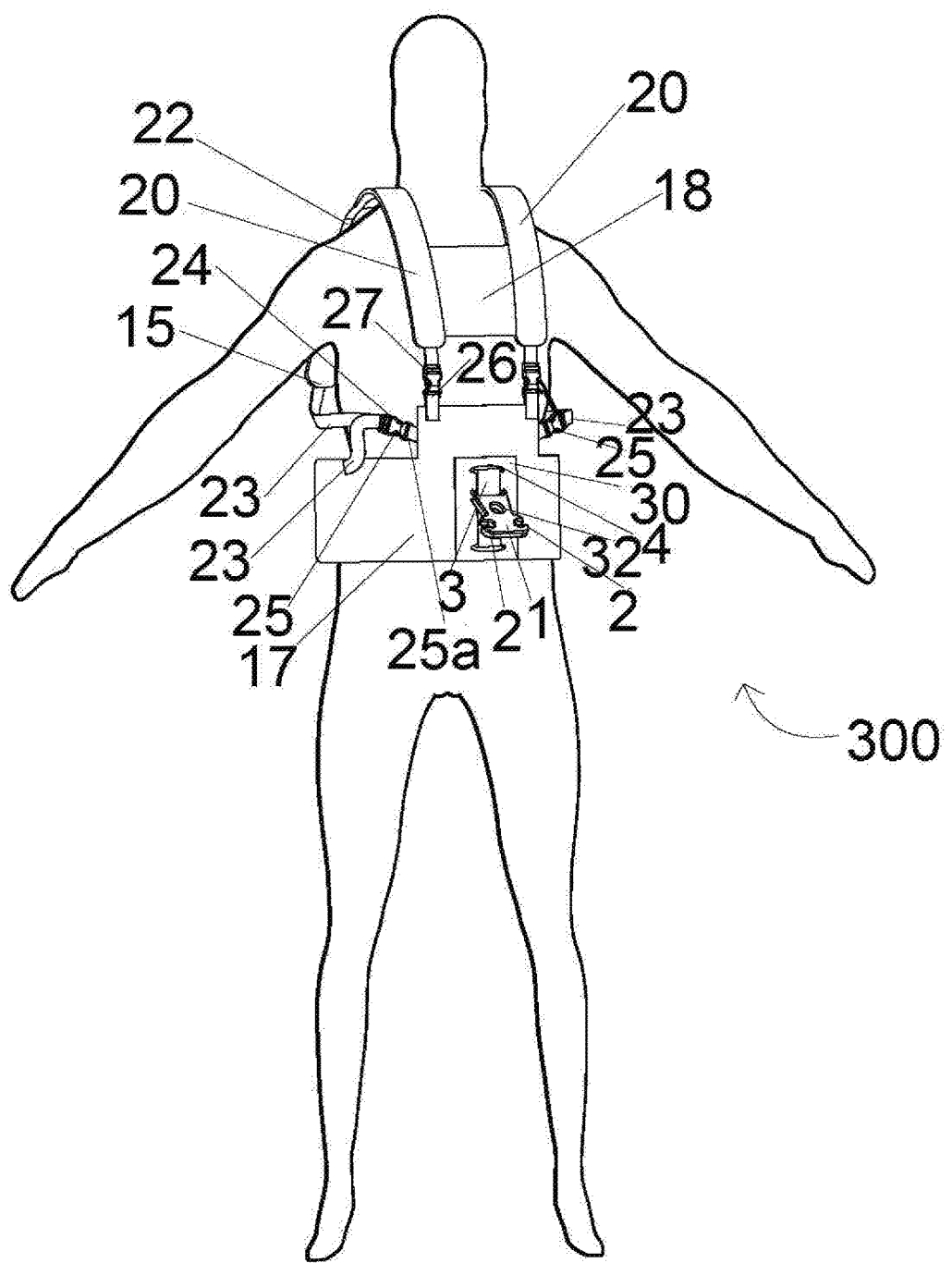
FIG. 4 is a rear perspective view of the tow harness of FIG. 1 being worn by an operator.

Referring now to FIG. 4, a harness 300 according to an embodiment of the invention is depicted with a rear portion on the operator. The harness 300 substantially resembles the harness 100 of FIGS. 1-3, with the harness 300 being secured to the operator with shoulder straps 20 attached along with back support 18. By providing a single point of attachment on the towing strap 3, the towing connector 1 can slide up and down. A universal joint (not shown) can be provided on the towing connector 1 between the towing strap 3 and the attachment points 4, which in this embodiment are eyelets. The universal joint (not shown) can be a ball and socket type joint or it can simply be constructed from a flexible material such as webbing, rubber, or rope. The universal joint can be biased (e.g., constructed from an elastic material) to return to its "home" position projecting radially outward from the back 7 of the harness 300.

Strain exerted by the towing connector 1 on the towing strap 3 can be more evenly distributed through the attachment points 4. Additionally, the dual points of attachment prevents the towing connector 1 from "sagging" downward, thereby facilitating hooking and unhooking rope 48 onto the looping and hook portion of the towing connector 1, as seen in FIGS. 6-7.

Figure 5:
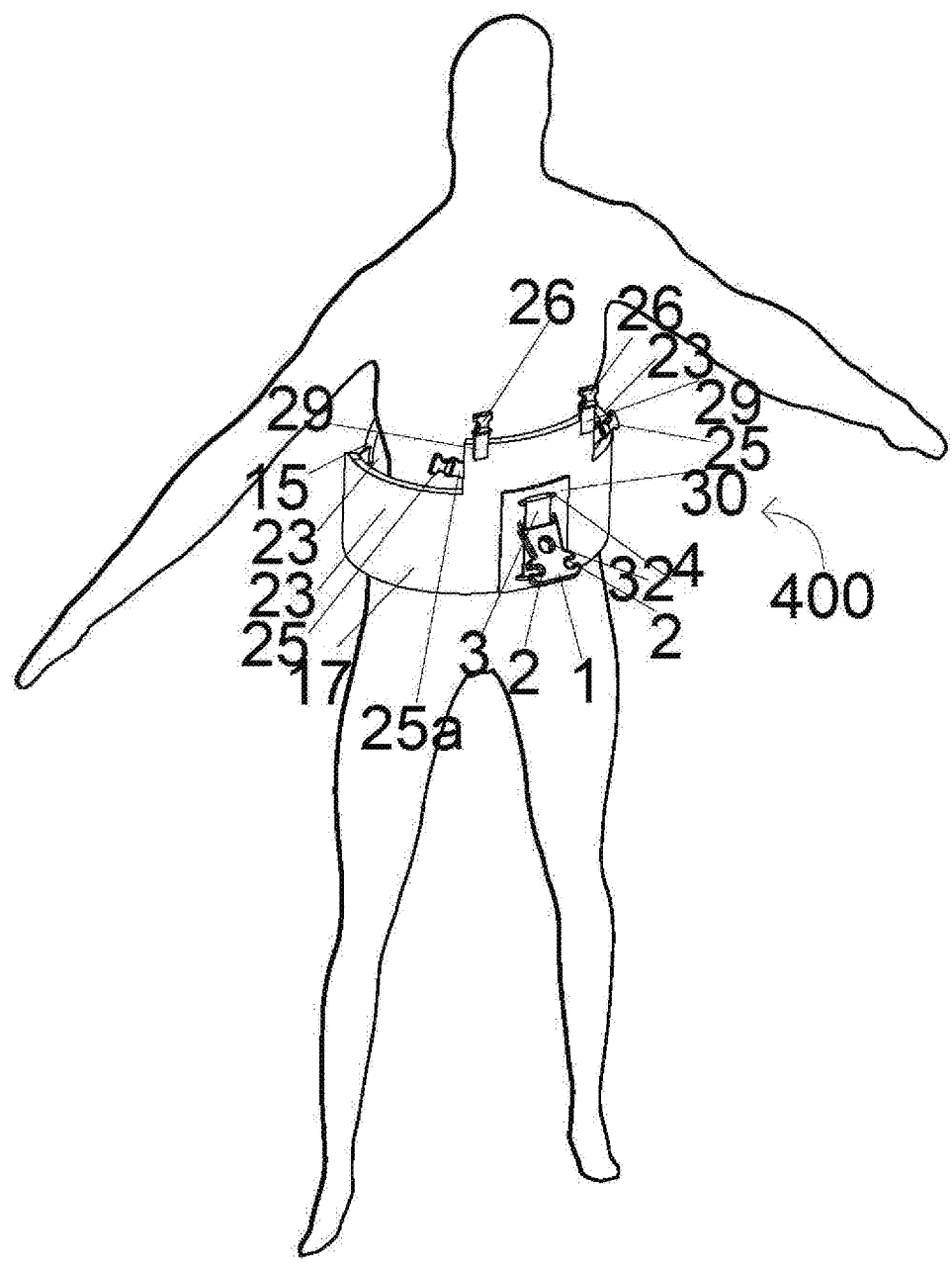
FIG. 5 is a rear perspective view of the tow harness of FIG. 1 in an alternative configuration being worn by an operator.

Referring now to FIG. 5 a harness 400 according to an embodiment of the inventions is presented. The harness 400 is substantially similar to the harness 300 of FIG. 4, with the shoulder straps 20 being removed. The harness 400 provides the wearer with more freedom for running without shoulder straps 20. The mechanism for adjustment is lessened making it easier with less adjusting of straps. When the shoulder straps 20 are off there is less chafing or rash. It is up to the wearer whether or not they implement the harness shoulder straps 20. When the shoulder straps 20 are detached, the clips hang out of the way. The operator will not be bothered by the existing inferior shoulder strap female-end buckles 25 and superior female-end buckle strap 26.

FIG. 6 depicts a harness 500 according to an embodiment of the invention that substantially resembles the harness 100 when attached to a human. The back section 7 of the harness 500 is connected to a rope 48. The rope 48 is connected to a handle 49. A towboarder 53 can hold onto the handle 49 and be pulled on a surface while standing on a board 52.

FIG. 7 depicts a harness 600 that substantially resembles harness 500, further depicting a towboarder 53, behind the operator 54 of the harness 600. First, the tow point is optimal for the towboarder 53 and the operator 54. Second, the operator 54 of the towboarding harness 500 has an optimal angle for towing the towboarder 53 on a board 52.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A harness comprising:
   a back section;
   a padded waist strap extending from the back section and comprising a waist strap connector;
   a waist strap attached to the padded waste strap and comprising a waist strap connector;
   a towing strap attached to a posterior surface of the back section; and
   a towing connector slidably coupled to the towing strap; wherein the waist strap connector of the waist strap is operable to couple to the waist strap connector of the padded waist strap.

2. The harness of claim 1 wherein the towing strap is connected to the back section at first and second ends of the towing strap.

3. The harness of claim 2 wherein the first and second ends of the towing strap are attached to the back section such that the towing connector may slide generally vertically along the towing strap.

4. The harness of claim 2 wherein the distance between the point of attachment of the first and second ends of the towing strap is within the range from one inch to four inches.

5. The harness of claim 2 wherein the first and second ends of the towing strap are attached to the back section such that the towing connector may slide generally horizontally along the towing strap.

6. The harness of claim 1 wherein the towing strap is attached to the back section at a first end of the towing strap.

7. The harness of claim 1 wherein the towing strap is attached to the back section so as to permit the towing connector to be positioned proximately to a posteroanterior axis of a user.

8. The harness of claim 1 wherein the towing strap has a width of 1.5 inches and a thickness within the range from 0.06 inches to 0.08 inches.

9. The harness of claim 1 wherein:
   the back section comprises a reinforcement platform, defining a reinforced area; and
   the towing strap is connected to the back section within the reinforced area.

10. The harness of claim 9 wherein the attachment of the towing strap to the back section defines a gap between the towing strap and the reinforcement platform of up to 1.18 inches.

11. The harness of claim 1 wherein:
    the back section comprises a plurality of shoulder strap connectors;
    the harness further comprises a plurality of shoulder straps comprising a plurality of shoulder strap connectors; and
    the shoulder strap connectors of the plurality of shoulder straps are operable to couple to the shoulder strap connectors of the back section.

12. The harness of claim 11 wherein the plurality of shoulder straps each comprise chest connectors operable to couple to one another and positioned so as to be coupled across the chest of a user.

13. The harness of claim 11 further comprising a back support attached to each of the plurality of shoulder straps, thereby connecting the shoulder straps to one another.

14. The harness of claim 1 wherein the waist strap further comprises padding configured to be positioned to interface with the abdomen of a user.

15. A harness comprising:
    a back section comprising a reinforcement platform defining a reinforced area;
    a padded waist strap extending from the back section and comprising a waist strap connector
    a waist strap attached to the padded waist strap comprising a waist strap connector;
    a towing strap attached to a posterior surface of the back section within the reinforced area at first and second ends; and
    a towing connector slidably coupled to the towing strap;

wherein the first and second ends of the towing strap are attached to the back section such that the towing connector may slide generally vertically along the towing strap; and wherein the waist strap connector of the waist strap is operable to couple to the waist strap connector of the padded waist strap.

16. The harness of claim 15 wherein the attachment of the towing strap to the back section defines a gap between the towing strap and the reinforcement platform within the range from two to three centimeters.

17. The harness of claim 15 wherein the towing strap has a width of 1.5 inches and a thickness within the range from 0.06 inches to 0.08 inches.

18. The harness of claim 15 wherein the towing strap is attached to the back section so as to permit the towing connector to be positioned proximately to a posteroanterior axis of a user.

19. The harness of claim 15 wherein:
the back section comprises a plurality of shoulder strap connectors;
the harness further comprises a plurality of shoulder straps comprising a plurality of shoulder strap connectors; and
the shoulder strap connectors of the plurality of shoulder straps are operable to couple to the shoulder strap connectors of the back section.

20. The harness of claim 19 wherein the plurality of shoulder straps each comprise chest connectors operable to couple to one another and positioned so as to be coupled across the chest of a user.

\* \* \* \* \*